Jan. 9, 1934.　　　　C. B. UPTON　　　　1,942,624
COOKER
Filed Oct. 5, 1931　　　3 Sheets-Sheet 1

INVENTOR.
Charles B. Upton
by Parker & Brocknow
ATTORNEYS.

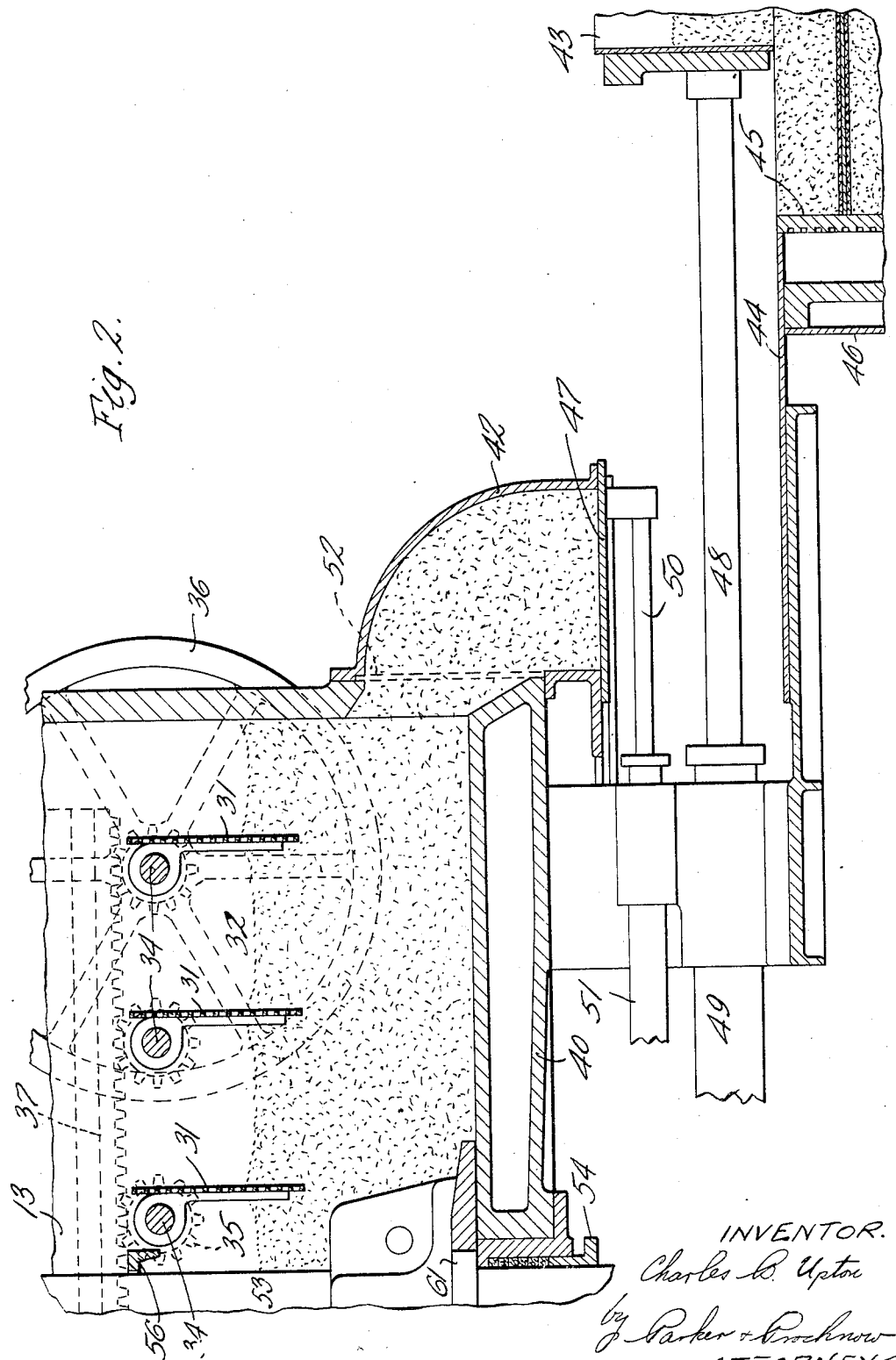

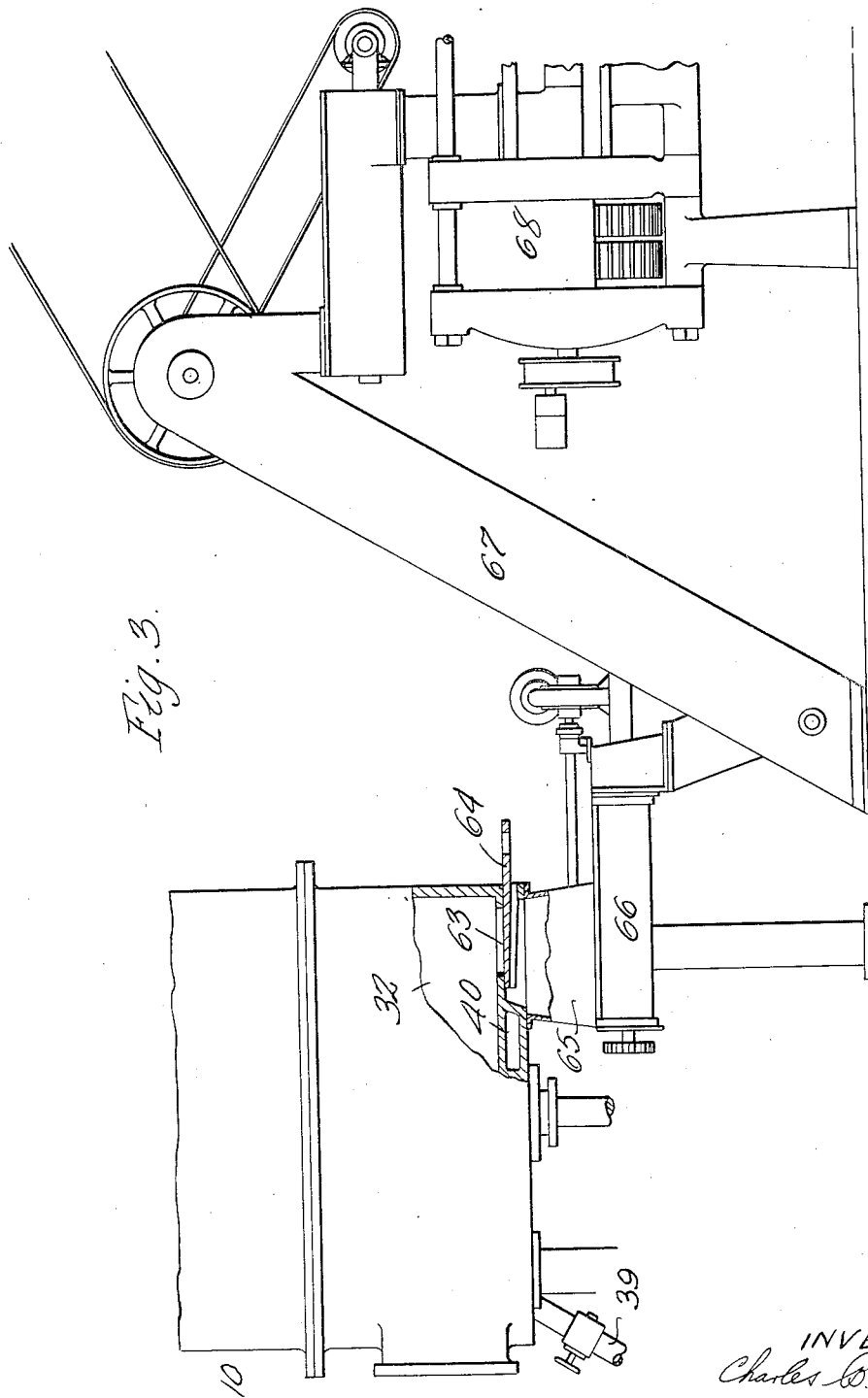

Patented Jan. 9, 1934

1,942,624

UNITED STATES PATENT OFFICE 1,942,624

COOKER

Charles B. Upton, Piqua, Ohio

Application October 5, 1931. Serial No. 567,072

10 Claims. (Cl. 87—6)

This invention relates to cookers of the type which may be used for cooking various materials such as lard, fats, meat scraps, packing house offals, garbage, fish, or other oil or fat bearing materials. Heretofore, vertical and horizontal cookers have been used to cook the product, during which cooking a quantity of free grease accumulated. The entire charge or batch was then dumped from the cooker into an open pan, and the material was thereafter shoveled manually from the pan to the press or expeller. There is usually enough material in the cooker to make several pressings, and since one pressing usually occupies an hour or more, some of the remaining material will be held in the receiving pan frequently for as long as three or four hours, during which time it cools very noticeably. As a result of the cooling the oil gets thick and heavy, and is not as easily or fully expressed in the press as when hot. The manual shoveling of this hot steamy mass from the pan into the press or expeller, is an unpleasant job, and the odor goes through the plant and often is very objectionable in the neighborhood of the plant.

An object of this invention is to provide an improved method and apparatus for cooking the mass and delivering it to a cake former or expressing device in a manner to eliminate largely the escape of objectionable odors, and to avoid the necessity of manually shovelling the material to the press or expeller, and also to keep the material at a desired temperature until it is all passed to the press or expressing device.

Another object of the invention is to provide an improved cooker with which the maximum amount of free liquid may be removed during a continuous process of cooking and pressing, and with which the products being cooked and pressed will be handled in a simple and inexpensive manner; which will insure a maximum yield of grease or liquids, and which will be relatively simple, compact, highly efficient and relatively inexpensive.

Various other objects and advantages will be apparent from the following description of an embodiment of the invention, and the novel features will be particularly pointed out hereinafter in connection with the appended claims.

In the accompanying drawings:

Fig. 2 is an enlarged section of part of the cooker and showing on a larger scale the mechanism for delivering the drained material to the press; and, Fig. 3 is an elevation of other mechanism for receiving the cooked mass from the cooker.

Figure 1:
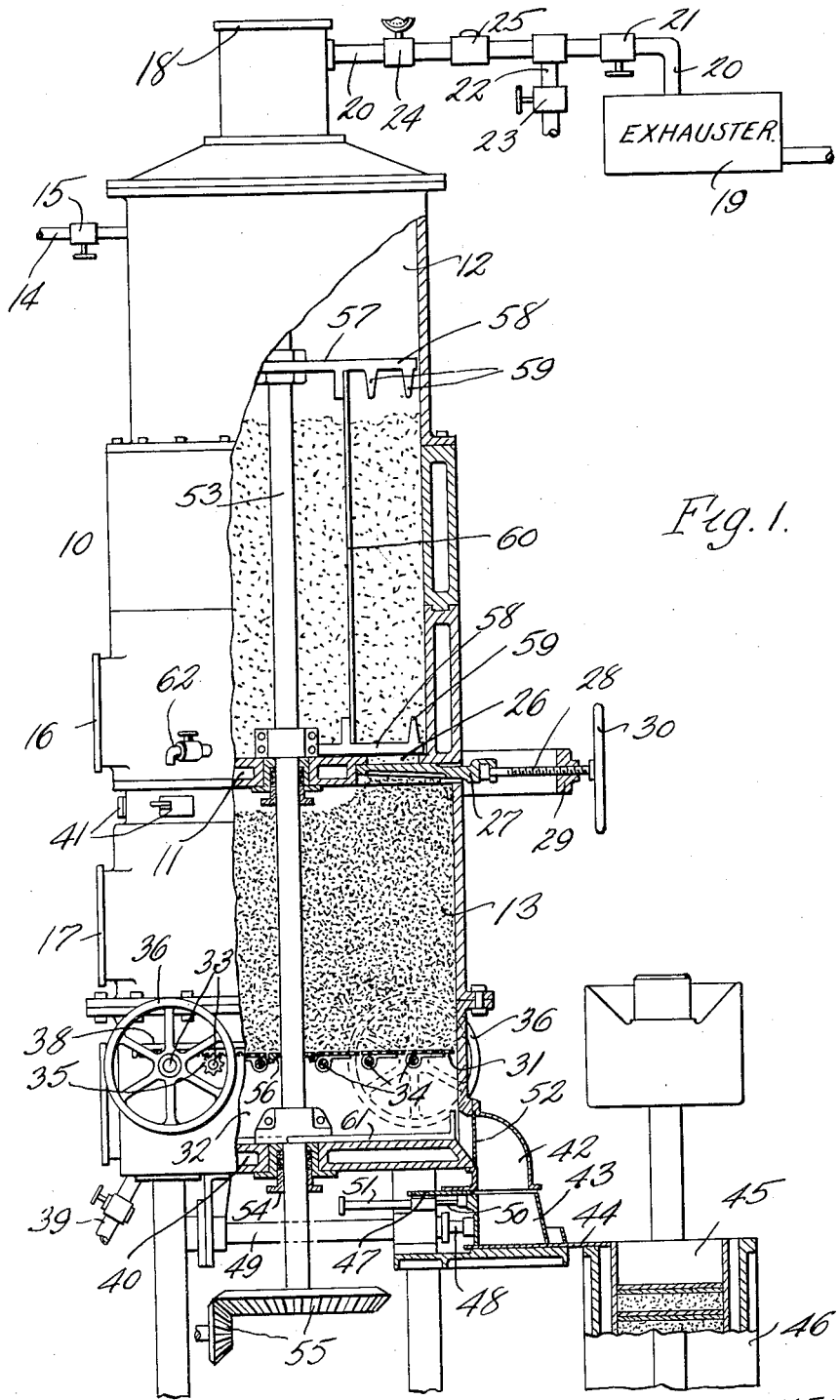
Fig. 1 is an elevation, partly in section, of a cooker and press, constructed in accordance with this invention.

In the embodiment of the invention illustrated in Figs. 1 and 2, the cooker includes a vertical stack 10, subdivided by a steam jacketed floor or wall 11 into an upper cooking chamber 12 and a lower holding or drainage chamber 13. The upper or cooking chamber 12 is considerably larger than chamber 13, because during the cooking process the material shrinks approximately 60 percent in volume. The side walls of the cooking chamber 12 are steam jacketed, as shown in Fig. 1, and a steam supply pipe 14, controlled by a valve 15, may be connected to the upper end of the cooking chamber, so as to admit live steam directly into the chamber and accelerate the cooking, especially when heating up a new batch of material. Suitable manholes 16 and 17 are arranged at different levels of the vertical stack 10 to enable convenient access to both the chambers 12 and 13. These manholes are, of course, covered by suitable removable closures.

The charge of material to be cooked or rendered may be inserted into the cooking chamber 12 through any suitable manhole provided for that purpose, or through the opening in the top of the chamber 12, which is normally closed by the removable cover 18. A suitable exhauster 19 or other vacuum-creating device, such as an exhaust pump, or barometric condenser and steam ejector, is connected by a pipe 20 to the upper part of the cooking chamber so as to create a partial vacuum in the cooking chamber as a part of the cooking operation. A valve 21 in this pipe 20 enables one to shut off the exhauster 19 when one desires to break the vacuum or to cook under pressure.

Between the valve 21 and the cooking chamber 12, the pipe 20 is connected to a branch pipe 22 controlled by a valve 23 and this branch pipe 22 acts as a relief vent to break the vacuum or to reduce the pressure in the cooking chamber before the cooking chamber is opened. Also in the pipe 20 between the valve 21 and the cooking chamber are arranged a pressure gage 24 and a safety relief valve 25.

The floor or wall 11 dividing the stack into the two chambers 12 and 13, is provided with a discharge passage 26 which is normally closed by a gate or valve 27 which is pressure and vacuum tight. This valve is shown as of the sliding type and is operated into open position by a screw 28 that is rotatably connected to the valve or gate threaded through a bracket arm 29, and then provided with a hand wheel 30. A grate or grid-like partition 31 is disposed horizontally across the holding or lower chamber 13 so as to divide it into an upper and major compartment which receives the mass of cooked material from the cooking chamber, and a smaller, lower or drainage compartment 32 into which free liquids may drain from the mass supported upon the partition 31 in the upper compartment.

The partition 31 is, of course, perforated or apertured so that the free liquids in the mass may drain off and the solids will be held back by the partition. The partition is in this sense a grid or grill and is formed of a plurality of sections, part or most of which are hinged upon a series of spindles 33 and 34. The sections forming one-half of the partition are hinged upon the spindles 33, and the other half are hinged upon the spindles 34. These spindles 33 and 34 extend entirely across the chamber and at least at one end through the stack wall, and are rotatably supported at both ends by the stack walls. The ends of the spindles which project through the wall of the stack are provided with pinions 35, and one of the spindles of each group 33 and 34 is provided with a hand wheel 36 or other operating means by which it may be rocked.

A rack bar 37 meshes with and connects the pinions of one group of the spindles, such as 34, and a second rack bar 38, Fig. 1, meshes with and connects the pinions on the spindles 33. Thus, by turning the hand wheel 36 on a spindle 33, not only is the grate section that is pivoted on that spindle rocked, but through the rack bar 38, all of the other spindles 33 will be similarly rocked, so as to move all of the partition sections in that half of the chamber, either into dumped position, as shown in Fig. 2, or into holding position, as shown in Fig. 1. Similarly, by turning the hand wheel 36 which is carried by a spindle 34, all of the spindles 34 will be rocked through the interconnection of the rack bar 37, Fig. 2, with the pinions 35 on the spindles 34. Thus, the partition sections in each half of the chamber may be operated separately from the sections in the other half.

The dumped position of the partition sections is shown in Fig. 2, from which it will be seen that the mass of cooked material which has been held by the partition will then slide into the lower or drainage compartment 32. A valve controlled drain pipe 39 is connected to the bottom of the lower compartment 32, so that the free liquid which drains through the partition 31 into the lower compartment will be immediately drawn off. It is desirable to keep all material in the chamber 13 heated, but it is not usually necessary to supply as much heat as is required for the cooking chamber. Accordingly, one of the walls of the chamber 13 is steam jacketed, and preferably it is the floor or wall 40 of the lower chamber 13 which is steam jacketed. The upper part of the chamber 13 is provided with any desired number of vents 41 through which steam or vapors from the holding chamber 13 may escape.

A delivery duct 42 is connected to the bottom of the compartment 32, so that when cooked solids held upon the partition 31 are dumped upon the steam jacketed bottom 40 of the lower chamber, they may be removed through the delivery duct to an expressing device of any desired construction. The duct 42 opens through a side wall adjacent the bottom and is turned downwardly at its free end. A measuring or charge box 43 is disposed below the delivery end of the duct 42 and reciprocates across a table 44 to a position over a chamber 45 of an expeller 46. The bottom of the box 43 is open, but is normally closed by the table or surface 44 upon which it slides until it reaches a position over the chamber 45 of the expeller, at which time the contents may fall into the chamber of the expeller.

The box is shown beneath the delivery duct 41 in Fig. 1, and in Fig. 2 is shown in a position occupied when shifted over the chamber 45 of the expeller. A slide plate 47 is fitted to close the delivery end of the duct 42, between it and the box 43, and is mounted to slide from an inactive or non-obstructive position shown in Fig. 1, into the position shown in Fig. 2 in which it closes the discharge end of the duct 42 when the charging box 43 has moved away from the delivery duct to deposit a charge in the press or other expeller. The operation of the charging box and plate 47 is disclosed fully in the application of Forest C. Simon, Serial No. 326,235, filed December 15, 1928, to which reference may be had for a more complete disclosure of this mechanism.

The charging box 43 is operated by a piston 48 which reciprocates in a cylinder 49. The piston and cylinder perform as a double acting motor to reciprocate the box 43 between the positions shown in Figs. 1 and 2. The closure plate 47 is operated by a similar and smaller auxiliary piston 50 that reciprocates in a cylinder 51. The piston 50 bears, at the end connected to the plate 47, against the box 43, and is normally held thereagainst by the fluid pressure in the small cylinder piston 53. When the box moves away from the filling position shown in Fig. 1, the piston 50 will follow the box until it reaches its limit of movement, at which time the plate 47 completely closes the discharge end of the duct 42 and holds it closed during the continued travel of the charging box 42.

When the charging box in returning approaches filling position, it will re-engage the piston 50 and force it into its cylinder 51 and open the plate 47 while the box 43 moves into the filling position. The piston 50 and cylinder 51 thus form a single-acting hydraulic motor to operate the closure plate 47. While the mass of cooked material is being supported on the partition 31, it is desirable to close the delivery duct 42, and for that purpose a slide valve or shutter 52 is provided at the entrance of the duct 42 to slide horizontally or crosswise of the duct 42 and close or open it, as desired. This plate is shown in the closed position in Fig. 1, and in open position in Fig. 2.

An agitator shaft 53 extends upwardly through the bottom 40 of the lowermost chamber 13 and through the bottom or wall 11 separating chambers 13 and 14 from one another. The shaft is suitably mounted for rotation at its upper end in suitable bearings in the walls or floors 11 and 40. Stuffing glands 54 are provided for the shaft 53 where it passes through the floor or bottom walls 11 and 40, so as to prevent leakage along the shaft. The shaft at its lower end is driven by suitable gearing 55, but the section 56 of the partition 31 through which the shaft passes is stationary. Since the shaft is not of great diameter, the fixed section 56 may be relatively narrow and is preferably apertured for drainage purposes.

The shaft 53 is provided with a stirrer or agitator 57 in the cooking chamber 12. This agitator may be of any suitable construction and is carried by the shaft 53 for rotation therewith. In the particular example illustrated, this agitator consists of a pair of double arms 58 which are fixed on and rotate with the shaft 53. One double arm 58 is placed closely adjacent to the floor or wall 11 at the bottom of the cooking chamber, and the other double arm is disposed near the top of the chamber. These arms are curved somewhat spirally from the shaft so that when rotated they will tend to propel the mass outwardly toward the periphery or side wall of the cooking chamber.

The arms 58 are provided with projections 59 which extend toward one another vertically. Some of these arms may also be connected by blades 60, only one being shown in Fig. 1, disposed at different distances from the shaft so as to travel in different paths. A double arm 61 is fixed upon the shaft 53 in the compartment 32 at the lower end of the holding chamber 13 and is curved somewhat spirally from the shaft so as to sweep any solids resting on the floor 40 of the lower chamber 13 toward the entrance to the delivery duct 42.

In operation, the gate 27 is closed and a charge or batch of uncooked material or products is placed in the cooking chamber 12. Steam is then admitted to the jacketed side walls of this cooking chamber and to the floors 11 and 40, and the shaft 53 is rotated so as to agitate the mass in the cooking chamber. Live steam is also preferably admitted for a short interval through the pipe 13 to the cooking chamber to raise the mass to the cooking temperature as quickly as possible, after which this steam is shut off. It is usually preferable to cook the mass first under pressure, so as to soften the bones and tough parts, and in such a case, the valves 21 and 23 are closed so that as steam is generated in the cooking chamber and retained, the pressure and temperature of the mass will increase. The safety valve 25 prevents excessive or dangerous pressures being created in the cooking chamber, and the gage 24 indicates the pressure in the cooking chamber at all times. Samples for testing may be withdrawn from the cooking chamber at different intervals through a valve-controlled pipe 62, Fig. 1.

After a selected interval of cooking under pressure, some of the steam is shut off, the valve 23 opened to relieve the pressure and then again closed. The valve 21 to the exhauster is then opened. A partial vacuum is then created in the cooking chamber and the cooking continued for another desired interval, during which much excess moisture is carried off without danger of discoloring or overheating the mass. After the cooking under these conditions has been continued for the desired interval, the vacuum is broken by closing the valve 21 and opening the valve 23. The gate 27 is now opened by rotation of the wheel 30. The cooked mass is then discharged into the lower or holding chamber 13, during which the agitator gradually works or sweeps the cooked mass to the passage 26 which is now open. At this time, of course, the partition sections are all horizontal, as shown in Fig. 1, and they support this cooked mass spaced above the floor 40 of the lower chamber. Any free liquid in the mass then drains into the lower compartment 32 and is drawn off through the pipe 39. The slide 52 is, of course, closed at this time.

The gate or valve 27 is again closed, a new charge or batch placed in the cooking chamber, and a new cooking operation started. There is no agitator in the holding compartment where the mass is supported on the partition 31 because the liquid drains off more completely and satisfactorily when the mass is quiescent. After all excess moisture is drained off, the pipe 39 is closed, and the wheels 36 turned to dump the drained mass upon the floor 40 of the lower compartment, as shown in Fig. 2. Since the shaft 53 is rotating continuously, the sweeping arms 61 which move across the floor 40 will sweep the mass into the delivery duct 42, it being understood that the valve 52 is now open.

The charging box 43 is then filled, carried to the hydraulic press or liquid expeller, discharged and returned to the position shown in Fig. 1, for a fresh mass. Thus, the cooked solids are removed from the lower chamber 13 as needed for the press or expeller in fractional batches, and the mass will be kept at a desired temperature in the chamber 13 until it is fully removed from the chamber. When all of the solids have been removed from the lower chamber, the sections of the partition 31 are returned to their horizontal positions shown in Fig. 1, ready to receive a new batch of cooked material from the cooking chamber.

In the embodiment of the invention illustrated in Fig. 3, the cooker has its delivery opening 63 in the bottom wall 40 of the lower chamber 32. This opening 63 is normally closed by a slide valve 64 replacing the valve 52 of Figs 1 and 2. The opening 63 communicates with a delivery duct 65 leading to an automatic, power-operated, adjustable delivery feeder 66 which delivers the cooked mass to a conveyor or drag elevator 67. The elevator 67 discharges the elevated mass into a suitable expeller 68 in which all remaining liquid is expressed from the mass. Otherwise the cooker is the same as described in connection with Figs. 1 and 2.

It will be noted that with this arrangement, no manual handling of the cooked mass is required, and there is very little opportunity for the escape of obnoxious odors. All free liquid is separated from the cooked mass by drainage while the mass is still hot, and the mass is kept at a temperature suitable for pressing until all of it is utilized. This results in a greater yield of oil or other expressed liquid.

It will be obvious that various changes in the details which have been herein described and illustrated in order to explain the nature of the invention, may be made by those skilled in the art within the principle and scope of the invention as expressed in the appended claims.

I claim:

1. An improved cooker and rendering device for oleaginous and like materials comprising a plurality of chambers arranged in a superposed relation to one another, a gate between adjacent chambers by which the products to be rendered may descend from chamber to chamber, means for cooking said products in the upper chamber, a grille-like partition extending transversely across the lowermost chamber and spaced above the bottom thereof for dividing that chamber into a major holding compartment in the upper part thereof and a minor drainage compartment in the lower part thereof, whereby free liquid from the products held in the holding compartment may drain into the lower compartment, a conduit connected to said drainage compartment for removing the liquids from the lower compartment, an agitator in the cooking chamber and another in the lower compartment below said partition, said lower compartment having a delivery opening connected thereto by which any solids contained therein may be removed, said grille-like partition being selectively operable to pass said products from the upper compartment to the lower compartment in the lowermost chamber, from which said products may be removed in measured fractional batches, and means accessible from outside the lower chamber for operating said partition to pass said products.

2. An improved cooker for oleaginous and like materials, comprising a plurality of superposed chambers, a gate between adjacent chambers by which material in the upper chamber may be caused to descend into a lower chamber, means for heating and agitating the material in the upper chamber, a grate-like partition across the lower chamber between its upper and lower ends and rockable to dump any material resting thereon upon the bottom of the lower chamber, said lower chamber having an outlet below said partition, by means of which said materials may be removed from the lower chamber at a point below said grate whereby material received in the lower chamber may be supported on said grate and free liquids allowed to drain therefrom, and then discharged upon the bottom thereof, and an outlet pipe for draining off free liquids falling upon the bottom of the lower chamber.

3. An improved cooker for oleaginous and like materials, comprising a tubular stack divided into a plurality of superposed chambers, means associated with the upper chamber for cooking any material placed therein, a gate device connecting adjacent chambers and selectively operable to discharge material from the cooking chamber into a lower chamber, a grate-like partition extending across the lower chamber at a point spaced above the bottom thereof and below the top thereof for receiving and supporting the material discharged into that chamber from the cooking chamber, whereby free liquids in the material received in the lower chamber may drain through said partition into the bottom part of that chamber, an outlet pipe for drawing off the liquids reaching the lower part of the lower chamber, said partition having sections operable to dump said material, after drainage, upon the bottom of the lower chamber, and said lower chamber having a discharge opening leading from the long part thereof below said partition, through which the solid material which is discharged upon the bottom of said lower chamber upon operation of said partition sections may be removed from the cooker.

4. An improved cooker for oleaginous and like materials comprising a stack divided into a cooking chamber, and a receiving chamber below the cooking chamber, a gate controlled passage connecting said chambers, whereby communication between said chambers may be established or fully cut off, means for heating both chambers, and means for subjecting the upper chamber to pressure or vacuum cooking conditions selectively, a grate-like support in said lower chamber spaced above the bottom thereof, to provide a holding compartment in the upper section thereof, and a drainage compartment in the lower section thereof, whereby free liquids in the materials discharged into the holding compartment from the cooking chamber may drain into the lower compartment, an outlet pipe for removing the liquids collecting in the drainage compartment, and an outlet conduit for removing the mass from said drainage compartment in fractional batches, as desired.

5. An improved cooker for oleaginous and like materials comprising a vertical stack divided into superposed chambers, a gate controlled passage connecting adjacent chambers, means for creating cooking conditions in the upper chamber, a grate-like partition in the lower chamber some distance above the floor thereof and holding above the floor thereof any material received in that chamber from the cooking chamber above it, means for removing free liquids collecting in the lower chamber beneath said partition, means for operating said partition to dump any material held thereon on the floor of that chamber, a discharge duct leading from the bottom part of said lower chamber, and a sweeping agitator operating in close proximity to the floor in said lower chamber for working the material dumped by said partition toward the discharge duct.

6. An improved cooker for oleaginous and like materials comprising a vertical stack divided into superposed chambers, means for creating desired cooking conditions in the upper chamber, a gate controlled passage connecting said chambers by which material may be discharged from the upper chamber into the lower chamber by gravity, a grate-like partition extending across the lower chamber slightly above the bottom thereof, for receiving and supporting the material discharged into that chamber from the upper chamber of the stack, means for heating the floor of the lower chamber, means for removing from said heated floor any free liquids falling thereon from the material supported on said partition, said lower chamber having a vent above said partition, said partition being operable to dump the mass supported thereon upon the floor of that chamber after drainage has progressed to the desired extent, a duct leading from the lower part of said lower chamber for delivering the material dumped upon said heated floor, and a sweeping device in said lower chamber below said partition for working the material dumped by said partition toward said delivery duct.

7. An improved cooker, comprising a vertical stack divided into superposed chambers, means for creating desired cooking conditions in the upper chamber, means for selectively dropping the material, carried in the upper chamber, by gravity into the lower chamber, a grate-like partition extending across the lower part of the lower chamber and supporting material received from the upper chamber spaced above the bottom of the lower chamber, whereby free liquids may drain from the material supported on said partition, means for removing liquids collecting on the bottom of said lower chamber, a delivery duct leading from the lower chamber below said partition, means for operating said partition to dump the material supported thereon upon the bottom of that chamber, and means in the lower chamber below said partition for working the solid material, dumped upon the bottom of the lower chamber, towards the delivery duct.

8. An improved cooker for oleaginous and like materials which comprises a pair of superposed chambers having a delivery passage between them through which the materials being cooked may descend from the upper to the lower chamber, means controlling said passage, means for cooking the materials in the upper chamber, a perforate support in said lower chamber above the bottom thereof for receiving the material from said passage, and operable to dump the material upon the bottom of that chamber, a delivery outlet for solids leading from said lower chamber below said support, means in said lower chamber below said support for draining liquids collecting in said lower chamber below said support, and means for feeding the material from which oil is drained toward said outlet.

9. An improved cooker for oleaginous and like materials comprising a pair of superposed chambers, a passage connecting said chamber by which a material being cooked may pass from the upper to the lower chamber, means for creating desired cooking conditions in the upper chamber, a grille provided in said lower chamber slightly above the bottom thereof for supporting the cooked mass in said chamber in a position to allow liquids to drain therefrom, means for removing liquids draining into the portion of said lower chamber below said grille, a delivery outlet leading from said lower chamber and below said grille, means for shifting said grille within said chamber in a manner to deposit said drained mass on the bottom of the lower chamber, and means in said lower chamber below said grille for delivering said mass progressively to said outlet.

10. An improved cooker for oleaginous and like materials comprising a pair of superposed chambers, a passage connecting said chamber by which a material being cooked may pass from the upper to the lower chamber, means for creating desired cooking conditions in the upper chamber, a grille provided in said lower chamber slightly above the bottom thereof for supporting the cooked mass in said chamber in a position to allow liquids to drain therefrom, means for removing liquids draining into the portion of said lower chamber below said grille, a delivery outlet leading from said lower chamber and below said grille, means for shifting said grille within said chamber in a manner to deposit said drained mass on the bottom of the lower chamber, and means in said lower chamber below said grille for delivering said mass progressively to said outlet.

CHARLES B. UPTON.